Patented Apr. 22, 1930

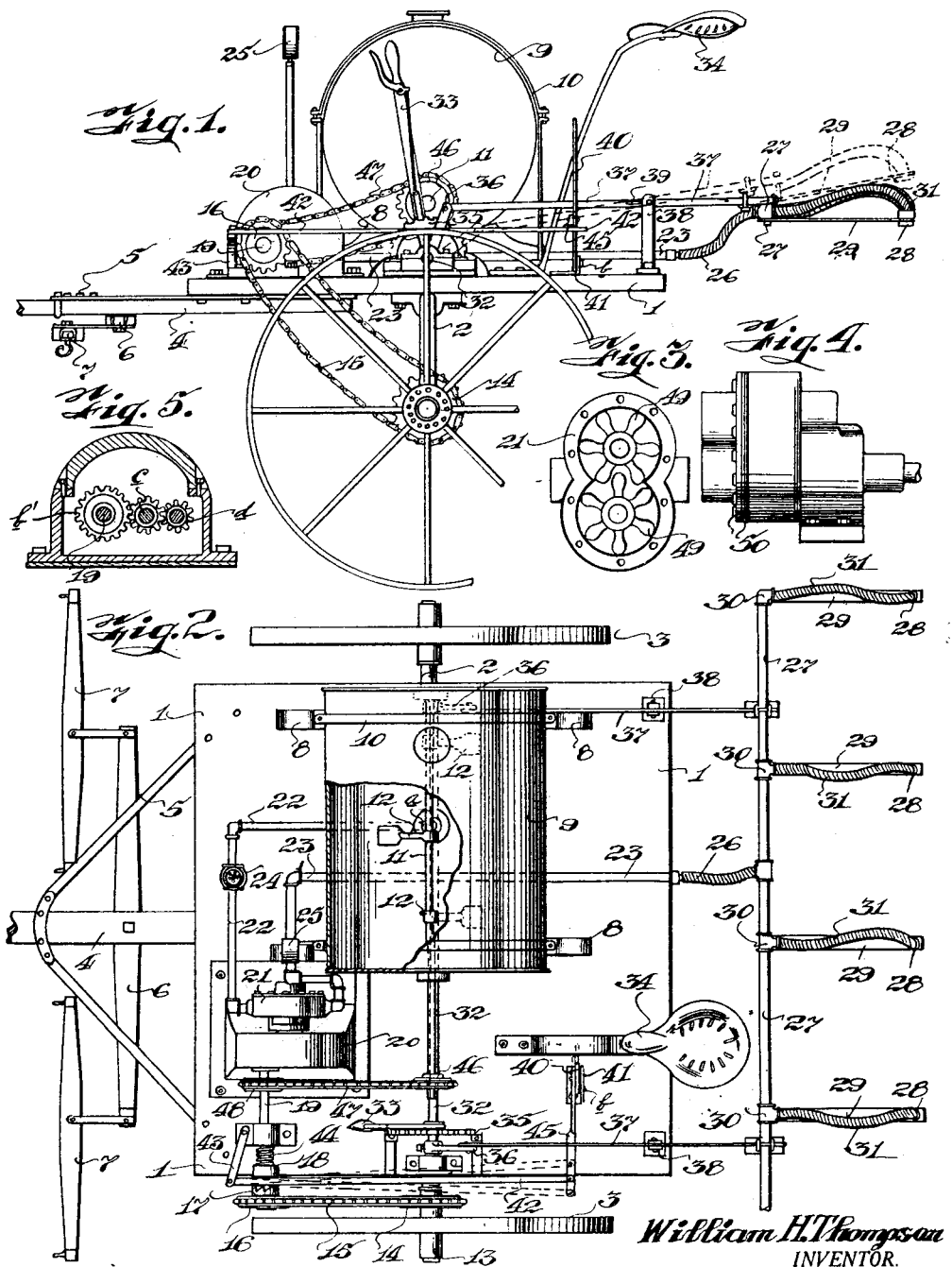

1,755,716

UNITED STATES PATENT OFFICE

WILLIAM H. THOMPSON, OF WICHITA FALLS, TEXAS, ASSIGNOR TO J. W. DUNCAN, OF WICHITA FALLS, TEXAS

LIQUID-SPRAYING MACHINE

Application filed December 16, 1927. Serial No. 240,444.

This invention relates to liquid spraying machines, and more especially to the combination in a machine for the purpose of spraying row crops with liquid poison for insect infestation.

The invention aims among its objects to provide an adjustable boom to which is connected a series of spray nozzles, and movement of this boom to collectively alter the positions of said spray nozzles with respect to the plants over which the machine is being drawn, which enables the machine to be used in spraying plants in different stages of growth.

It is further the object of the invention to provide a machine for the purposes set forth, of such simple construction as to enable the same to be produced and sold at a nominal figure and to enable those having limited, as well as expansive acreage, to effectively exterminate weevils, worms and all other depredatory insects preying upon their crops.

With the foregoing objects as paramount, the invention has particular reference to its salient features of construction and arrangement of parts by which said objects are attained, and which will become manifest as the description proceeds, taken in connection with the accompanying drawings wherein:—

Figure 1 represents a side elevational view of a machine constructed according to the present invention, and Figure 2 is a top plan view of the invention.

Figure 3 is a fragmentary front view of a pump with the face plate and gaskets removed, and Figure 4 is a fragmentary side view of the pump with the face plate and gaskets in place.

Figure 5 is cross-sectional view of the preferred type of speed reduction unit.

Continuing now more in detail with the drawings, 1 designates a platform supported upon a U frame 2, in turn supported upon wheels 3. While the machine may be arranged so as to be self propelled, it is shown herein as being equipped to be horse drawn, and in this regard, a tongue 4 is provided, braced by the member 5, and to the tongue is connected a doubletree 6, carrying singletrees 7, of a conventional construction.

Situated upon the platform 1, upon supports 8 is a drum 9, adapted to contain a form of liquid poison. This drum is held rigid upon its mounting by straps 10 surrounding the same and fastened at their ends to said supports 8.

Extending through the drum is an agitator shaft 11, and spaced upon this shaft in equidistant relationship are paddles 12. Poison of a liquid nature is usually composed of two or more ingredients, and to avoid against separation of such ingredients, thorough and constant agitation within the drum is desirable, consequently, rotation of shaft 11 will operate to cause the paddles 12 to churn the contents of the drum and keep the ingredients of the poison thoroughly mixed. Further reference will be made presently to the agitator shaft 11.

Mounted upon one of the wheel axles, and fixed to rotate with the wheel 3 is a collar 13, and fixed to this collar is a sprocket wheel 14. As the machine is moved, rotation of wheels 3 will rotate sprocket 14, and through chain 15, rotation is imparted to sprocket 16, to rotate clutch part 17, fixed to said sprocket 16, and when clutch part 17 is moved by means later referred to, into engagement with clutch part 18, fixed to shaft 19, rotation is imparted to the latter.

A speed reduction unit 20 is provided by which the desired speed may be obtained in the pressure pump 21 adjacent to the said unit, but since this latter element is of a conventional construction, it is not considered necessary to illustrate and describe in detail its construction. The pressure pump 21 likewise is of a conventional nature, but it should be borne in mind that the particular relationship of the elements referred to is considered as a special feature in that the pump is enabled to produce a non-pulsating discharge at any pressure up to approximately 150 pounds.

Through a system of gears contained within the unit 20, as illustrated in Figure 5, driving power is supplied to the pump 21 at the proper speed, causing liquid to be drawn from the drum 9, through feed line 22, through the pump 21 and out through discharge line 23. Feed line 22 receives liquid from the tank outlet *a*, in its bottom, as shown in Figure 2, and has therein a cut off valve 24. Discharge line 23 is provided with a pressure gauge 25. The speed reducing or controlling unit 20, is preferably constructed in the manner shown, providing a housing in which a gear *b'* is mounted on the drive shaft 19 enmeshing an intermediate gear *c*, which latter imparts rotation to pump gear *d* to drive the pump. By the provision of the series of gears, a more positive and uniform drive is obtained. Moreover, by substituting the gears in the unit 20 for gears of larger or smaller diameter, the pressure of the pump is increased or decreased accordingly.

Connected to the discharge end of discharge line 23 is a flexible high pressure hose 26, which extends and is connected to the boom, consisting of a lateral pipe 27, the ends of which overreach the span of the wheels 3. In order to effectively spray five rows of vegetation, an equal number of discharge nozzles 28 are provided and supported from the boom by strips 29 secured thereto and extending rearwardly of the machine. Spaced connections 30 are provided to which sections of high pressure hose 31 are connected, their other ends being connected to the spray nozzles 28.

As shown in Figure 1, the boom 27 is capable of adjustment vertically, which is obtained through lateral shaft 32, extending the width of the platform 1 beneath the drum 9. A lever 33, conveniently near the operator's seat 34, is fixed to shaft 32 and controlled by quadrant 35. Movement of the shaft 32 by lever 33 will impart motion to the short arm 36, fixed also to the shaft, hence rocking the arms 37, one of which is arranged near either end of the shaft 32. The arms 37 are connected to the boom 27, and are centrally supported by standards 38. Movement of the arms 37 such as imparted thereto by the arms 36, acts to displace the pivotal point of arms 37 in the slot 39. Dotted lines in Figure 1 show the raised position of the boom, and while the lowered position is not shown, this position may be obtained by reverse movement of lever 33.

Referring now to Figure 2, and the means by which the machine is thrown into and out of gear; a clutch lever 40 is provided near the operators seat 34 and pivoted at *b* to an angle iron brace 41. A long arm 42 is pivoted at one end to a short link 43; near the clutch 18, and is so connected to the clutch member 18, that movement of its opposite end as indicated by dotted lines in Figure 2 will move the clutch member 18 with respect to member 17, against the tension of spring 44. In order to accomplish this, a link 45, is connected to the clutch lever 40, and to the free end of arm 42.

Thus it can be seen that the operator has full control of the machine at all times.

Returning to the agitator, it will be seen in both Figures 1 and 2 that the shaft 11 protrudes beyond the end of the drum 9 and has mounted thereon a sprocket wheel 46. A chain 47 surrounds this sprocket and another sprocket 48 mounted upon shaft 19. Through this arrangement, the shaft 11 and the paddles 12, carried thereby are operated to continuously stir and mix the liquid poison composition within the drum 9, during the time the machine is in motion, or when in gear.

Referring again especially to the pump 21, partly shown in Figures 3 and 4, it will be noted that this pump is the co-operating rotary gear type, composed of gears 49, and is provided with a laminated face plate gasket 50 arranged intermediate the pump housing and face plate 51. This arrangement affords means by which the efficiency of the pump may be kept at the maximum by simply removing worn gaskets, thus maintaining the face plate in contact with the gears 49.

Manifestly, the construction shown is capable of considerable modification, and such modification as considered in keeping with the appended claims is also considered within the spirit of the invention.

I claim:

1. In a liquid spraying machine, a frame, a liquid receptacle carried by the frame, a pipe extending transversely of the frame and communicating with said receptacle, nozzles carried by the pipe, standards projecting upwardly from the frame, a rock shaft on the frame spaced from the standards, radial arms on the shaft, horizontal arms having slots between their ends, means to pivotally connect the horizontal arms at one end thereof to the radial arms, means to rigidly connect the horizontal arms at their opposite ends to the pipe, and pins on the standards extending through the slots of the horizontal arms to support the later for vertical pivotal and longitudinal sliding movements.

2. In a liquid spraying machine, a frame, a liquid receptacle carried by the frame, a pipe extending transversely of the frame and communicating with said receptacle, nozzles carried by the pipe, standards projecting upwardly from the frame, a rock shaft on the frame spaced from the standards, radial arms on the shaft, horizontal arms, means to pivotally connect the horizontal arms at one end to the radial arms, means to rigidly connect the horizontal arms at their opposite ends to the pipe, and means to connect the horizontal arms to the standards for both vertical pivotal and longitudinal sliding movements.

In testimony whereof I affix my signature.

WILLIAM H. THOMPSON.